US008855305B2

(12) United States Patent
Devanand et al.

(10) Patent No.: US 8,855,305 B2
(45) Date of Patent: *Oct. 7, 2014

(54) METHODS AND APPARATUS FOR PROTECTING DIGITAL CONTENT

(75) Inventors: Priyadarsini Devanand, San Jose, CA (US); Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,819

(22) Filed: Dec. 22, 2011

(65) Prior Publication Data

US 2012/0158965 A1     Jun. 21, 2012

Related U.S. Application Data

(63) Continuation of application No. 12/215,009, filed on Jun. 24, 2008, now Pat. No. 8,155,321, which is a continuation of application No. 12/154,766, filed on May 27, 2008, now Pat. No. 8,259,949.

(51) Int. Cl.
*H04L 9/32* (2006.01)
*H04L 9/06* (2006.01)
*H04L 9/08* (2006.01)

(52) U.S. Cl.
CPC ............... *H04L 9/08* (2013.01); *H04L 9/0681* (2013.01); *H04L 9/3294* (2013.01)
USPC .......................................... 380/201; 709/225

(58) Field of Classification Search
None
See application file for complete search history.

(56) References Cited

U.S. PATENT DOCUMENTS

| 6,477,252 | B1 | 11/2002 | Faber et al. |
| 6,671,803 | B1 | 12/2003 | Pasieka |
| 6,731,758 | B1 | 5/2004 | Graunke et al. |
| 6,920,221 | B1 | 7/2005 | Faber et al. |
| 6,931,129 | B1 | 8/2005 | Faber et al. |
| 6,947,558 | B1 | 9/2005 | Graunke et al. |
| 6,956,949 | B1 | 10/2005 | Faber et al. |
| 7,043,021 | B2 | 5/2006 | Graunke et al. |
| 7,068,786 | B1 | 6/2006 | Graunke et al. |
| 7,233,666 | B2 | 6/2007 | Lee |
| 7,349,537 | B2 | 3/2008 | Kramer et al. |
| 7,369,661 | B2 | 5/2008 | Graunke |
| 7,373,506 | B2 | 5/2008 | Asano et al. |
| 7,603,131 | B2 * | 10/2009 | Wang et al. ................ 455/456.3 |
| 7,948,961 | B2 * | 5/2011 | Mahesh et al. ................ 370/345 |

(Continued)

OTHER PUBLICATIONS

"Advanced Encryption Standard," from Wikipedia, (http://en.wikipedia.org/wiki/Advanced_Encryption_Standard), Dated Nov. 26, 2001, pp. 51.

(Continued)

*Primary Examiner* — Fikremariam A Yalew
(74) *Attorney, Agent, or Firm* — Trop, Pruner & Hu, P.C.

(57) ABSTRACT

An embodiment of the invention includes a processing system to provide protected digital content, the processing system comprising a processor and control logic which, when used by the processor, results in the processing system performing operations comprising determining first and second receivers, which are coupled to the processing system, are within a predetermined acceptable proximity to the processing system. The processing system is upstream to the first receiver and the first receiver is upstream to the second receiver. Other embodiments are provided herein.

18 Claims, 10 Drawing Sheets

(56) References Cited

U.S. PATENT DOCUMENTS

| | | | |
|---|---|---|---|
| 8,155,321 | B2 | 4/2012 | Devanand et al. |
| 8,161,564 | B2 | 4/2012 | Devanand et al. |
| 8,259,949 | B2 | 9/2012 | Devanand et al. |
| 2003/0005324 | A1* | 1/2003 | Epstein .................. 713/200 |
| 2004/0064694 | A1 | 4/2004 | Lee et al. |
| 2004/0156500 | A1 | 8/2004 | Faber et al. |
| 2006/0248340 | A1* | 11/2006 | Lee et al. ............... 713/181 |
| 2008/0008317 | A1 | 1/2008 | Graunke |
| 2009/0296941 | A1 | 12/2009 | Devanand et al. |
| 2010/0005289 | A1 | 1/2010 | Devanand et al. |
| 2010/0042831 | A1 | 2/2010 | Bahr et al. |
| 2010/0208895 | A1 | 8/2010 | Boneh et al. |

OTHER PUBLICATIONS

"Block cipher modes of operation," from Wikipedia (http://en.wikipedia.org/wiki/Block_cipher_modes_of_operation).

"How PGP works," from (http://www.pgpi.org/doc/pgpintro/).

"High-bandwidth Digital Content Protection System," Rev. 1.3, Dec. 21, 2006, pp. 1-90.

"Displayport™ Content Protection (DPCP), ECC Standard," Version 0.80 Rev 1.10 Promoter Draft, Mar. 24, 2006.

Non-final Office Action U.S. Appl. No. 13/418,886 mailed Jan. 31, 2013 and Reply.

Final Office Action U.S. Appl. No. 13/405,819 mailed Aug. 19, 2013 and Pre-Appeal Brief.

Final Office Action U.S. Appl. No. 13/338,371 mailed Aug. 28, 2013 and Pre-Appeal Brief.

Non-final Office Action U.S. Appl. No. 13/338,371 mailed Jan. 29, 2013 and Reply.

Non-final Office Action U.S. Appl. No. 13/405,819 mailed Jan. 31, 2013 and Reply.

Final Office Action U.S. Appl. No. 13/418,886 mailed Jun. 20, 2013 and Reply.

Non-Final Office Action U.S. Appl. No. 12/154,766 mailed Oct. 12, 2011 and Reply.

Non-Final Office Action U.S. Appl. No. 12/214,949 mailed Jan. 14, 2011 and Reply.

Final Office Action U.S. Appl. No. 12/214,949 mailed Jul. 6, 2011 and Pre-Appeal Brief.

Non-Final Office Action U.S. Appl. No. 12/215,009 mailed Jan. 14, 2011 and Reply.

Final Office Action U.S. Appl. No. 12/215,009 mailed Jun. 24, 2011 and Pre-Appeal Brief.

* cited by examiner

Encrypting Uncompressed Content

Frame Key Generation

Encrypting Compressed Content

METHODS AND APPARATUS FOR PROTECTING DIGITAL CONTENT

This application is a continuation of U.S. patent application Ser. No. 12/215,009, filed Jun. 24, 2008 now U.S. Pat. No. 8,155,321 and entitled "Methods and Apparatus for Protecting Digital Content", which is a continuation of U.S. patent application Ser. No. 12/154,766, filed May 27, 2008 now U.S. Pat. No. 8,259,949 and entitled "Methods and Apparatus for Protecting Digital Content". The content of both applications is hereby incorporated by reference.

FIELD OF THE INVENTION

The present disclosure relates generally to the field of data processing, and more particularly to methods and related apparatus for protecting digital content.

BACKGROUND

On Feb. 17, 2000, Intel Corporation published Revision 1.0 of the specification for the High-bandwidth Digital Content Protection (HDCP) System. This specification describes techniques for protecting digital content to be transmitted from a source device to a presentation device, possible via one or more intermediary repeater devices. On Dec. 26, 2007, Revision 1.3 of the specification for the HDCP System was published. The Revision 1.3 version of the specification is referred to herein as the "HDCP Specification version 1.3" or simply the "HDCP Specification."

The techniques described in the HDCP Specification may be used to support the secure transmission of digital video data. For instance, a video transmitter such as a set-top box or an optical disk player may use the techniques described in the HDCP Specification to connect with, and send digital video to, a video receiver such as a high-definition television.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
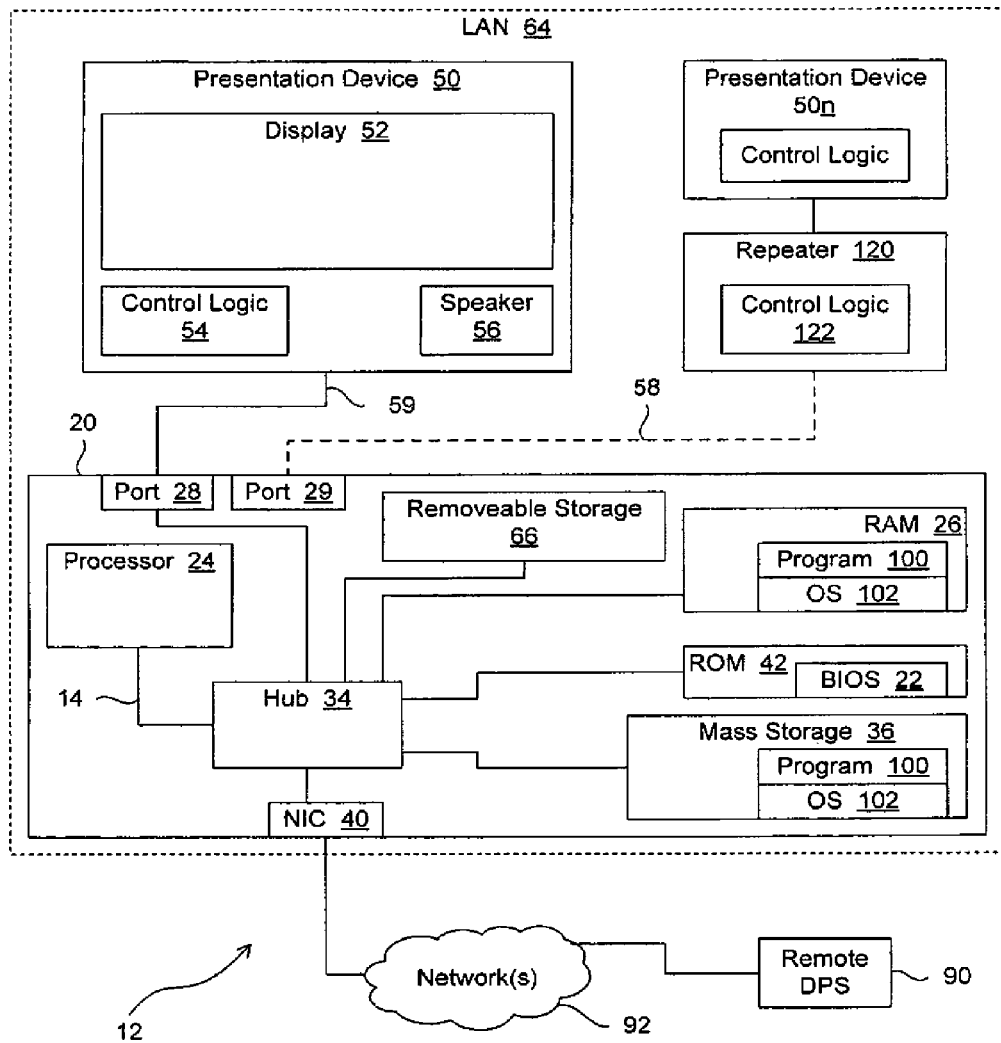
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that has various hardware and software components. The hardware components include a processor 24, random access memory (RAM) 26, and read-only memory (ROM) 42. Alternatively, a data processing system may include multiple processors. Processor 24 may include one or more processing units or cores. Such processing units may be implemented as Hyper-Threading (HT) technology, or as any other suitable technology for executing multiple threads or instructions simultaneously or substantially simultaneously.

Processing system 20 may also include other hardware components, and the hardware components may be communicatively coupled via one or more system buses 14 or other communication pathways or mediums. This disclosure uses the term "bus" to refer to shared (e.g., multi-drop) communication pathways, as well as point-to-point pathways, interconnect rings, etc. In the embodiment of FIG. 1, processing system 20 includes one or more volatile and/or non-volatile data storage devices, such as RAM 26, ROM 42, mass storage devices 36 such as hard drives, and/or other devices or media. For example, processing system 20 may include one or more removable storage devices 66, such as drives for digital versatile disks (DVDs) or other kinds of optical disks, floppy disk drives, tapes, flash memory, memory sticks, etc. For purposes of this disclosure, the terms "read-only memory" and "ROM" may be used in general to refer to non-volatile memory devices such as erasable programmable ROM (EPROM), electrically erasable programmable ROM (EEPROM), flash ROM, flash memory, etc. Processing system 20 may also have a chipset, a bridge, a hub 34, and/or other modules which serve to interconnect various hardware components.

Processing system 20 may be controlled, at least in part, by input from input devices such as a keyboard, a mouse, a remote control, etc., and/or by directives received from another machine, biometric feedback, or other input sources or signals. Processing system 20 may utilize one or more communication ports and one or more wired or wireless connections to communicate with one or more other data processing systems. Communication ports may also be referred to as input/output (I/O) ports, and they may be implemented as parallel ports, serial ports, universal serial bus (USB) controllers, high-definition multimedia interface (HDMI) ports, network interface controllers (NICs), modems, etc.

In various embodiments, processing systems may be interconnected by way of a physical and/or logical network, such as a local area network (LAN), a wide area network (WAN), an intranet, the Internet, etc. Network communications may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

The invention may be described herein with reference to data such as instructions, functions, procedures, data structures, application programs, configuration settings, etc. When the data is accessed by a machine, the machine may respond by performing tasks, defining abstract data types, establishing low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. The term "program" may also be used to refer to a set of one or more instructions resulting from processes such as translation, interpretation, compilation, linking, etc. Thus, the term "program" may be used to refer to any collection of instructions which, when executed by a processing system, performs a desired operation or operations.

In the embodiment of FIG. 1, processing system 20 also includes various software resources. For instance, ROM 42 includes a basic input/output system (BIOS) 22, and mass storage device 36 contains an OS 102 and at least one program 100. Processing system 20 can use BIOS 22 to boot, and can copy OS 102 and program 100 into RAM 26 and then execute OS 102 and program 100 on processor 24.

In one embodiment, processing system 20 is configured to operate as a set-top box and/or an optical disk player, and processing system 20 can send digital content to one or more external processing systems. For example, processing system 20 may provide digital video to presentation devices 50 and 50n, possibly via one or more repeater devices 120. Program 100 may include control logic for authenticating downstream devices, for encrypting content, for transmitting the encrypted content to authenticated devices, etc.

Similarly, presentation device 50 may include control logic 54 for authenticating presentation device 50 to processing system 20, for decrypting protected digital content received from processing system 20, and for presenting that content. For instance, presentation device 50 may include a high-definition display 52 and one or more speakers 56 for presenting content to the user.

Presentation device 50n may include similar components. Repeater device 120 may also include control logic 122 supporting the use of protected digital data. For example, control logic 122 may cause repeater 120 to authenticate itself to processing system 20, and for authenticating downstream devices, such as presentation device 50n. In addition, a device may be configured to serve as both a repeater and a presentation device. That is, certain devices may be capable of both presenting content and forwarding content to other presentation devices.

The control logic in each device may be implemented as hardware and software, possibly including embedded software. For example, in the embodiment of FIG. 1, program 100 resides in mass storage 36. However, in other embodiments, some or all of that control logic may reside elsewhere (e.g., in ROM 42). Example embodiments of various operations to be performed by processing system 20, the presentation device(s), and the repeaters (if any) are described in greater detail below.

For purposes of this disclosure, processing system 20 may be referred to as the source device, since it transmits protected content. Repeater 120 and presentation devices 50 and 50n may be referred to as receiving devices or downstream devices, since they may ultimately receive the content transmitted by the source device.

In the embodiment of FIG. 1, the source device and all downstream devices are part of a LAN 64. In particular, processing system 20 communicates with presentation device 50 via an I/O port 28 and a wired connection 59. Processing system 20 also communicates with repeater 120 via an I/O port 29 and a wireless connection 58. Thus, LAN 62 includes a wireless LAN (WLAN) that includes processing system 20 and repeater 120. In other embodiments, the source device and downstream devices may use all wired connection, all wireless connections, or other combinations of wired and wireless connections. Processing system 20 may also communicate with one or more remote data processing systems via a WAN. For instance, processing system 20 may use a NIC 40 and a WAN 92 to download content from remote data processing system 90.

Figure 2:
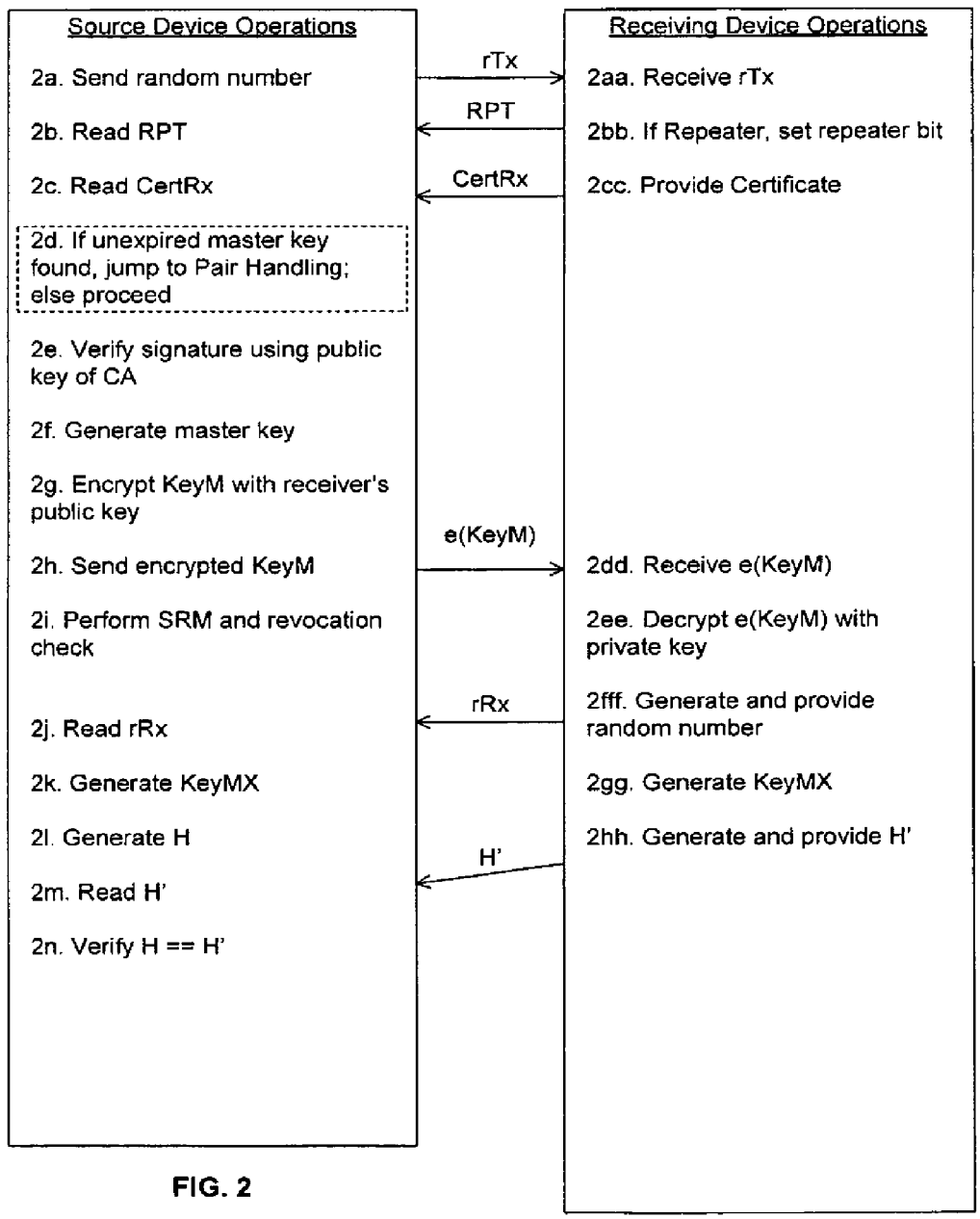
FIG. 2 is a diagram of an example embodiment of a process for authenticating devices and exchanging keys, in the context of the data processing environment of FIG. 1.

FIG. 2 is a diagram of an example embodiment of a process for protecting digital content, in the context of data processing environment 12. The illustrated process includes operations for device authentication and key exchange. As indicated by the headings in the two boxes of FIG. 2, the operations may be performed by a source device and a receiving device. For example, processing system 20 may operate as the source device, and presentation device 50 or repeater 120 may operate as the receiving device.

In one embodiment, all source, repeater, and presentation devices include two different values (e.g., source keys) that are provided by a central licensing authority under predetermined license terms. For instance, the license terms may prohibit the disclosure of those values to any party that has not agreed to the license terms. In the embodiment of FIG. 1, those two values are a 64-bit value and a 128-bit value. All devices may include the same 64-bit value and the same 128-bit value, and those values may remain static. Accordingly, those values may be referred to as a 64-bit global licensed constant and a 128-bit global licensed constant, respectively. The 64-bit global licensed constant may be referred to as LC64, and the 128-bit global licensed constant may be referred to as LC128.

For example, the manufacturer of a device may order a pair of licensed constants from the licensing authority. The manufacturer may store the licensed constants in the device during manufacture of the device, before the device is distributed to an end user.

The licensing authority may also serve as a certificate authority (CA). Entities or organizations that produce devices may subscribe with the CA, and the CA may provide each such entity or organization with a unique entity identifier. The CA may to serve as root trust authority, and may keep records that associate public keys with respective subscribers. The CA may also sign digital certificates for approved devices, to attest that a particular public key corresponds to a particular unique entity identifier. For instance, the manufacturer of a device can obtain a digital certificate from the CA and load the certificate into a device, and the device can thereafter use the certificate as proof that the device is an approved device. A challenger can use the digital certificate to verify that a public key in the certificate is authorized by the CA and belongs to the entity (e.g., the device manufacturer) identified by the certificate. In one embodiment, the organization known as Digital Content Protection, LLC (DCP) may serve as the licensing authority and CA. Since the certificates are used to protect rights to digital content, the CA may also be referred to as a digital rights management (DRM) authority.

In the embodiment of FIG. 1, the source device (e.g., processing system 20) also includes the public key of the CA. For instance, that public key may be a 3072-bit Rivest, Shamir, Adleman (RSA) public key, denoted by KeyPubCA.

The first stage in the authentication protocol may be referred to as authentication and key exchange (AKE). Processing system 20 may initiate authentication at any time, even before a previous authentication exchange has completed. To initiate authentication of a downstream device, processing system 20 generates a random number "rTx," and transmits rTx to the downstream device (e.g., presentation device 50), as shown at line 2a. For example, processing system 20 may initiate authentication in response to detecting an active downstream receiving device, in response to detecting a request from an upstream content control function to initiate authentication before playing a protected movie, etc. For instance, when serving as a DVD player, the source device may initiate authentication in response to detecting an attempt to play content that is protected by the Content Scramble System (CSS). In the embodiment of FIG. 2, the initiation message (i.e., rTx) is a 64-bit pseudo-random value.

If the device receiving rTx is a repeater, it responds to the rTx by setting a repeater bit "RPT" in the repeater that can be read by processing system 20, as shown at lines 2aa and 2bb. If the device receiving rTx is a repeater or a presentation device, the receiver responds to the rTx by making a certificate available for processing system 20 to read, as shown at line 2cc. For example, if the device receiving rTx is presentation device 50, presentation device 50 responds by making a public key certificate available to processing system 20.

In the embodiment of FIG. 1, presentation devices 50 and 50n and repeater 120 each contains a public key certificate issued by the CA. That certificate, which may be referred to as CertRx, includes the following fields: Receiver ID, Receiver Public Key, Reserved, and CA Signature.

Receiver ID occupies 64 bits, and stores a unique receiver identifier.

Receiver Public Key occupies 1048 bits and stores a unique RSA public key of the receiver. This key may be referred to as KeyPubRx. The first 1024 bits hold the big-endian representation of the modulus "n," and the trailing 24 bits hold the big-endian representation of the public exponent "e."

Reserved represents 16 bits that are reserved for future definition. This field should contain 0x0000 (where the prefix "0x" denotes hexadecimal notation).

CA Signature occupies 3072 bits, and stores a cryptographic signature calculated over all preceding fields of the certificate. The CA generates this signature using the signature scheme known as "RSA Signature Scheme with Appendix—Public-Key Cryptography Standards 1-v1.sub.—5" or "RSASSA-PKCS1-v1.sub.—5," defined by Public-Key Cryptography Standards (PKCS) #1 V2.1: RSA Cryptography Standard, dated Jun. 14, 2002. The secure hash algorithm (SHA) SHA-256 is used as the underlying hash function.

All values in the certificate may be stored in big-endian format. In addition, each presentation device and repeater also includes the private key corresponding to the public key for that device. Such a private key may be referred to as KeyPriv.

In the embodiment of FIG. 1, each device keeps its KeyPriv in secure storage, and each KeyPriv is a 1024-bit RSA private key.

As shown at line 2b, processing system 20 may read RPT from the downstream device. As described in greater detail below, if RPT is set, processing system 20 may subsequently perform authentication with repeaters.

As shown at line 2c, after reading RPT, processing system 20 reads CertRx from the downstream device. Processing system 20 may then extract the Receiver ID and KeyPubRx from CertRx. Processing system 20 may then use the Receiver ID to determine whether or not a technique referred to as "pairing" should be used to authenticate presentation device 50. For instance, processing system 20 may determine whether processing system 20 already contains a master key that corresponds to the Receiver ID. If processing system 20 finds a master key associated with the Receiver ID, the process may jump to a pair handling process, as shown at line 2d and described in greater detail with regard to FIG. 3.

However, if no such master key is found, processing system 20 may respond by using PKI techniques to authenticate presentation device 50 (e.g., to determine whether presentation device 50 is trustworthy). For instance, in the embodiment of FIG. 2, processing system 20 uses the public key of the CA to verify the signature in CertRx, as shown at line 2e. Failure of signature verification constitutes an authentication failure, and in response, processing system 20 may abort the authentication protocol.

However, upon successful verification, processing system 20 may generate a master key "KeyM," as shown at line 2f. In one embodiment, the source device generates a random 128-bit master key. As shown at line 2g, processing system 20 may then use KeyPubRx to encrypt KeyM. In one embodiment, the encrypted KeyM "e(KeyM)" is 1024 bits long; the source device uses the encryption scheme known as "RSA Encryption Scheme—Optimal Asymmetric Encryption Padding" or "RSAES-OAEP," as defined by PKCS #1 V2.1; and SHA-256 is the underlying hash function. As shown at line 2h, processing system may then send e(KeyM) to presentation device 50.

Processing system 20 may then verify integrity of a system renewability message (SRM) of presentation device 50 and may also perform a revocation check, as shown at line 2i. For example, processing system 20 may check the signature of the SRM using KeyPubCA. Failure of this integrity check constitutes an authentication failure and causes processing system 20 to abort the authentication protocol. If presentation device 50 passes the integrity check, processing system 20 determines whether the Receiver ID of the attached device is found in a revocation list. Processing system 20 may obtain revocation lists as part of content and/or SRMs, for example. For instance, an SRM may be received on a DVD containing a protected movie, as part of cable content transmission, etc.

If the Receiver ID is found in the revocation list, authentication fails and the authentication protocol is aborted. In one embodiment, the SRM integrity check and revocation check are performed only by the top-level source device.

In response to receiving e(KeyM), presentation device 50 uses its private key to decrypt KeyM, as shown at lines 2dd and 2ee. In one embodiment, the receiving device decrypts KeyM with its private key, using the RSAES-OAEP decryption scheme. After receiving e(KeyM), presentation device 50 generates a random number "rRx," and makes rRx available to processing system 20, as shown at line 2ff. In one embodiment, rRx is a 128-bit random value.

If presentation device 50 has passed the integrity and revocation checks, processing system 20 reads rRx, as shown at line 2j. In response, processing system 20 generates another key, based on (a) the random master key that was generated by processing system 20 and (b) the random number rRx that was generated by presentation device 50. Since this key is based on values generated by different devices, the key may be referred to as a combined key, a merged key, or a mixed key. In one embodiment, processing system 20 generates the mixed key by performing an exclusive-or (XOR) operation on KeyM and rRx. Accordingly, this mixed key may be referred to as KeyMX. For instance, presentation device 50 may compute KeyMX=KeyM XOR rRx, as shown at line 2k.

Processing system 20 may then compute a hash value "H," as shown at line 2l. In one embodiment, H is a 256-bit value generated by the hash-based message authentication code (HMAC) function HMAC-SHA256. For instance, processing system 20 may compute H=HMAC-SHA256(rTx, LC128||KeyM), where HMAC-SHA256 is computed over rTx, and the key used for HMAC is the concatenation of LC128 and KeyM, with LC128 in big-endian order, and KeyM appended in big-endian order.

Presentation device 50 may use substantially the same approach as processing system 20 to generate KeyMX and the hash value "H'," as shown at lines 2gg and 2hh. Presentation device 50 may then make H' available to processing system 20. In one embodiment, presentation device 50 makes H' available for the source device to read within a predetermined time interval from the time that the source device finishes writing e(KeyM) to the receiver. Similarly, the source device waits at least that time interval after sending e(KeyM) to the presentation device before reading H' from the presentation device. The predetermined period of time may be one second, for example. Accordingly, processing system 20 may read H' from presentation device 50 after waiting a suitable time, as shown at line 2m.

Processing system 20 may then verify whether H equals H', as shown at line 2n. Processing system 20 may consider a mismatch between H and H' to constitute an authentication failure, and in response may abort the authentication protocol.

Figure 3:
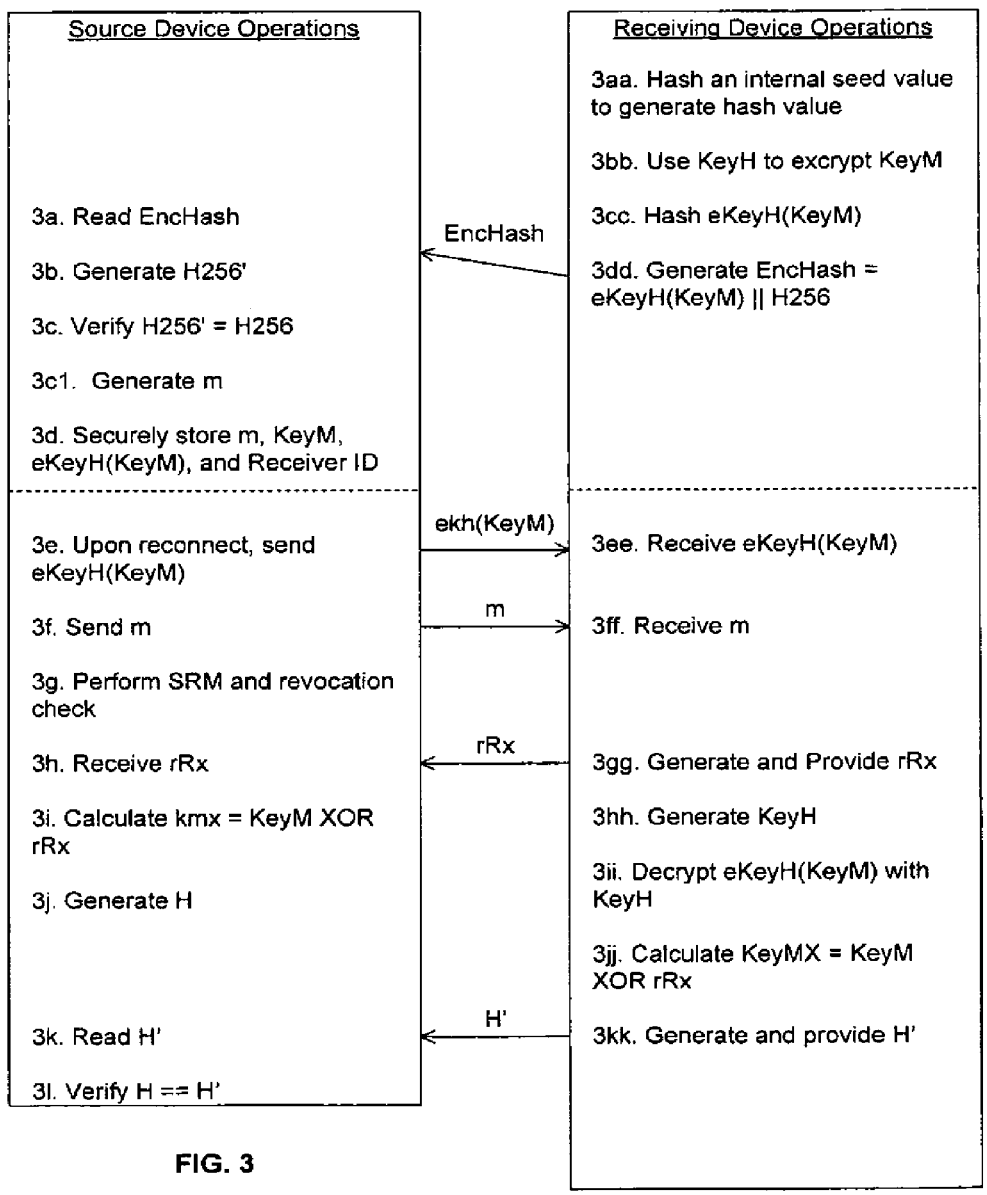
FIG. 3 is a diagram depicting another example embodiment of a process for authenticating devices and exchanging keys, in the context of the data processing environment of FIG. 1.

FIG. 3 is a diagram depicting an example embodiment of a process to support pairing, with regard to device authentication, in the context of the data processing environment of FIG. 1. FIG. 3 begins with operations for equipping a source device (e.g., processing system 20) and a downstream receiving device (e.g., presentation device 50) with data to be used for authentication during one or more subsequent sessions of interaction between that source device and that receiving device. This data may be referred to as pairing data. In one embodiment, the devices generate and store the pairing data in parallel with, or as part of, an AKE process. During one or more subsequent AKE procedures involving the same devices, those devices may use the pairing data to expedite the AKE process. In one embodiment, pairing is implemented only once during a session (i.e., for a given rTx value).

Regarding the generation of pairing data, in the embodiment of FIG. 3, line 3aa shows that presentation device 50 hashes an internal seed value to generate a hash value "KeyH." Presentation device 50 may perform this operation after generating H', as depicted in FIG. 2, in response to receiving e(KeyM) from processing system 20. When e(KeyM) is received from the transmitter, it is an indication to the receiver that the transmitter does not have a KeyM corresponding to the receiver. In one embodiment, presentation device 50 computes KeyH as the least significant 128 bits from the operation SHA-256(KeyPriv) (e.g., KeyH=SHA-256(KeyPriv)[127:0]).

As shown at line 3bb of FIG. 3, presentation device 50 may then use KeyH to encrypt KeyM. This encrypted value may be referred to as eKeyH(KeyM). In the embodiment of FIG. 3, eKeyH(KeyM) is a 128 bit value that presentation device 50 generates by encrypting KeyM with KeyH, using an advanced encryption standard (AES) cipher block in counter (CTR) mode. In particular, presentation device 50 generates a 128-bit value m=rTx||ctr, appended in big-endian order, where ctr is a 64-bit counter value that is reset to 0 at the beginning of the session (e.g., when presentation device 50 receives a new rTx from processing system 20). Presentation device 50 then uses m as input to the AES-CTR cipher module, along with KeyH. The 128-bit output is then XOR-ed with KeyM to generate eKeyH(KeyM).

Presentation device 50 may then append to eKeyH(KeyM) a 256-bit hash of eKeyH(KeyM). For instance, presentation device 50 may generate H256=SHA-256(eKeyH(KeyM)), as shown at line 3cc. In addition, presentation device 50 may generate a value that combines an encrypted value and a hash value, as indicated at line 3dd. This combined value may be referred to as EncHash, and it may be generated as EncHash=eKeyH(KeyM)||H256, where both source values are in big-endian order. In one embodiment, EncHash must be available for the transmitter to obtain within 10 milliseconds (ms) from the time that the transmitter finishes reading H' from the receiver.

As shown at line 3a, processing system 20 may read EncHash from presentation device 50. Processing system 20 may perform this operation after reading H', as shown at line 2m of FIG. 2, in response to determining at line 2d that processing system 20 does not have a master key for presentation device 50. In one embodiment, processing system 20 waits at least 10 ms after reading H' to read EncHash.

As shown at lines 3b and 3c of FIG. 3, processing system 20 then computes H256'=SHA-256(eKeyH(KeyM)) and compares H256' against H256 obtained from presentation device 50. If H256 does not match H256', processing system 20 may re-read EncHash from presentation device 50 and repeat lines 3b and 3c.

As shown at line 3c1, processing system 20 may generate a 128-bit value m=rTx.||ctr, where ctr is a 64-bit counter value that is reset to 0 at the beginning of the session (e.g., when processing system 20 send rTx to presentation device 50). When H256 and H256' match, processing system 20 stores m, KeyM, and eKeyH(KeyM) along with the Receiver ID in nonvolatile storage, as shown at line 3d. In one embodiment, KeyM and eKeyH(KeyM) are stored securely with integrity and confidentiality.

As indicated above, processing system 20 and presentation device 50 may then use the pairing data to expedite the AKE process for subsequent sessions. For instance, as indicated at line 3e, upon reconnect with presentation device 50, processing system 20 may simply send eKeyH(KeyM) to presentation device 50, instead of generating a master key, encrypting that master key, and sending that encrypted master key. Processing system 20 may send eKeyH(KeyM) after reading CertRx, in response to determining that processing system 20 contains a master key for presentation device 50, as reflected at line 2d of FIG. 2. As shown at line 3f of FIG. 3, processing system 20 may also send the m value corresponding to the Receiver ID of presentation device 50.

Also, as shown at line 3g, after sending m, processing system 20 may verify the integrity of the SRM and perform a revocation check. Processing system 20 may use techniques like those described above with regard to line 2l of FIG. 2. Failure of either check may constitute an authentication failure that causes the source device to abort the authentication protocol.

As shown at lines 3*ee*, 3*ff*, and 3*gg*, in response to receiving eKeyH(KeyM) and m from processing system 20, presentation device 50 may generate rRx and make rRx available for processing system 20 to read. In one embodiment, presentation device 50 generates rRx only after receiving e(KeyM) or eKeyH(KeyM).

In response to receiving eKeyH(KeyM), presentation device 50 may also compute KeyH=SHA-256(KeyPriv)[127:0], as indicated at line 3*hh*. As shown at line 3*ii*, presentation device 50 may then use KeyH to decrypt eKeyH(KeyM). For instance, presentation device 50 may decrypt eKeyH(KeyM) using the AES cipher block in counter mode, with the received m as input and KeyH as the key in to the AES-CTR module, thereby deriving KeyM.

As shown at line 3*jj*, presentation device 50 may then compute KeyMX=KeyM XOR rRx. As indicated at line 3*kk*, presentation device 50 may then generate H' and make H' available for processing system 20. For instance, presentation device 50 may compute H'=HMAC-SHA256(rTx, LC128||KeyM). In one embodiment, the receiver makes H' available for the transmitter to read within 10 ms from the time that the transmitter finishes writing m to the receiver.

As shown at lines 3*h* and 3*i* of FIG. 3, after successful SRM and revocation checks, processing system 20 may read rRx from presentation device 50, and may calculate KeyMX=KeyM XOR rRx, where KeyM is the master key stored during pairing between processing system 20 and presentation device 50, as described with regard to line 3*d*. As shown at lines 3*j*, 3*k*, and 3*l*, processing system 20 may then calculate H, read H' from presentation device 50, and verify whether H matches H'. Processing system 20 may use techniques like those described above with regard to lines 2*l*, 2*m*, and 2*n* of FIG. 2. However, in one embodiment, the source device waits at 10 ms after sending m before reading H'. Processing system 20 may consider a mismatch between H and H' to constitute an authentication failure, and in response may abort the authentication protocol.

If the receiving device is not a repeater, the authentication and key exchange process may end successfully upon verification that H matches H'.

However, referring again to line 2*b* of FIG. 2, if the source device determines that the receiving device has set RPT, the source device may perform additional operations for handling authentication for a repeater, after verifying that H matches H'. For instance, the source device may process a message "MSG" from the downstream device if the downstream device is a repeater, as indicated by the RPT bit. In one embodiment, the transmitter must receive MSG within 1.5 seconds after writing rTx to the receiver. On processing MSG, the transmitter reads a successful authentication bit "SUCCESS_AUTH" in the receiver. If this bit is set, it indicates that the repeater has successfully completed AKE on the devices downstream from the repeater. If MSG is not received within 1.5 seconds, authentication fails and the transmitter aborts the authentication protocol.

In one embodiment, the repeater generates MSG with SUCCESS_AUTH in response to the following conditions being met:
- All downstream HDCP-protected interface ports have successfully completed AKE with the attached HDCP receivers that are not HDCP repeaters (e.g., signature verification on the HDCP receiver's certificate was successful, SRM integrity check was successful, the attached HDCP receiver's Receiver ID was not found in the revocation list, and H' verification was successful).
- All downstream HDCP-protected interface ports have successfully completed AKE with the attached HDCP Receivers that are HDCP repeaters (e.g., signature verification on the HDCP repeater's certificate was successful, SRM integrity check was successful, the attached HDCP repeater's Receiver ID was not found in the revocation list, H' verification was successful, and MSG with the SUCCESS_AUTH bit set was received by the downstream HDCP-protected interface port from the HDCP repeater.

For instance, when wired HDMI or DisplayPort is the interface used, MSG may be a hot-plug-detect (HPD) interrupt. Alternatively, when an Internet protocol (IP) stream is used, for example, MSG may use the following format:

| Syntax | No. of Bits | Identifier |
| --- | --- | --- |
| AKE_RPTR_auth{ | | |
|    msg_id | 5 | uimsbf |
|    ake_seq_num | 6 | uimsbf |
|    reserved_bits | 4 | bslbf |
|    marker_bit | 1 | bslbf |
|    reserved_bits | 14 | bslbf |
|    SUCCESS_AUTH | 1 | bslbf |
|    marker_bit | 1 | bslbf |
| } | | |
| CRC_32 | 32 | rpchof |

However, any suitable type of message format and message content may be used as MSG, depending on the specific interface(s) used in other embodiments.

Figure 4:
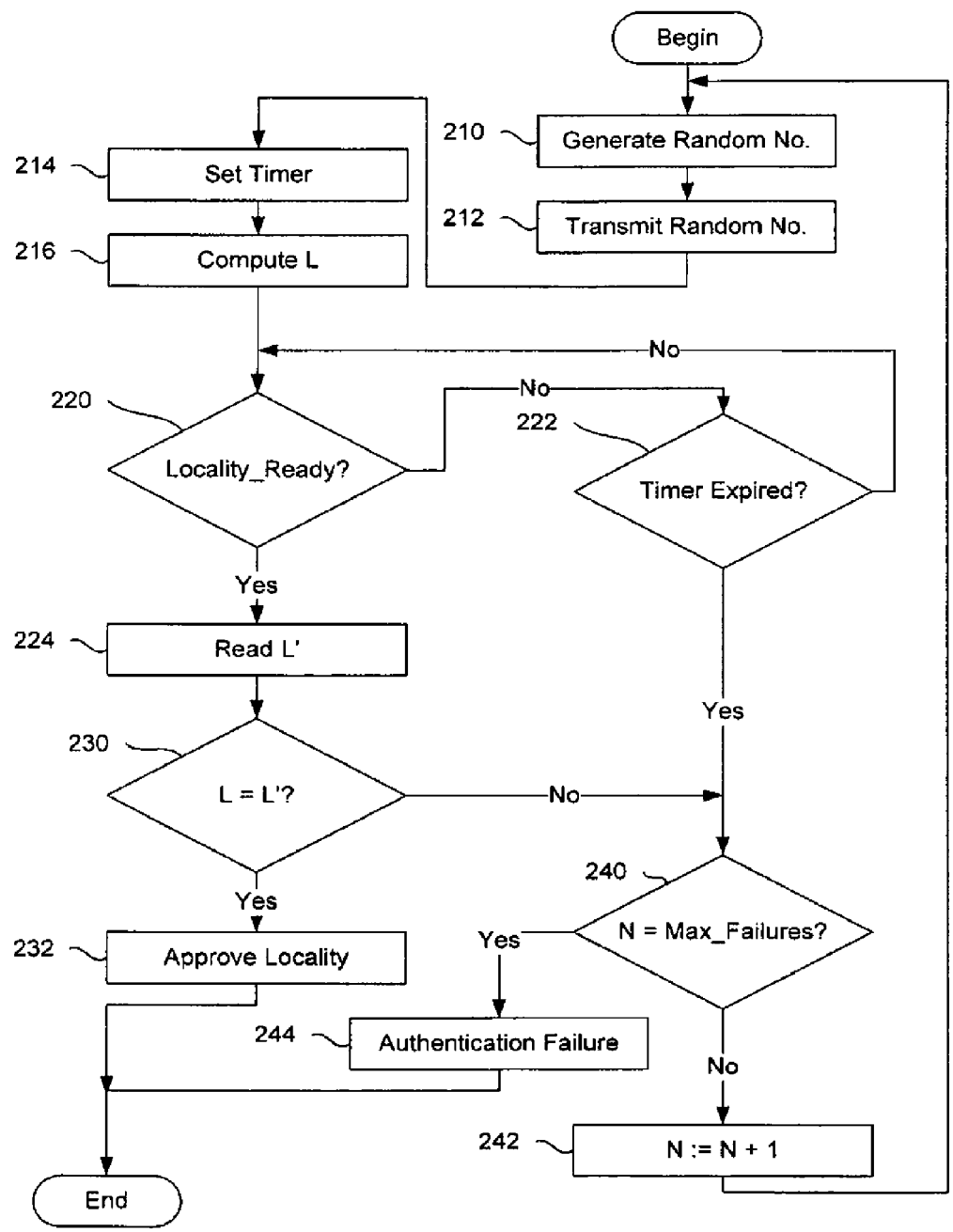
FIG. 4 is a flowchart depicting a process for checking locality according to an example embodiment of the present invention.

FIG. 4 is a flowchart depicting an example process for checking locality according to an example embodiment of the present invention. In the embodiment of FIG. 4, locality checking is used to ensure that all downstream devices are within a predetermined acceptable proximity to the most upstream transmitter. If any receiving devices are too distant from the most upstream transmitter, the locality check will fail.

Processing system 20 may perform a locality check after AKE and pairing. The locality check is typically initiated by the most upstream transmitter. For instance, processing system 20 may initiate the locality check by generating a 64-bit pseudo-random nonce "rN" and sending rN to the downstream device (e.g., repeater 120), as shown at blocks 210 and 212. Upon sending rN, processing system 20 sets a watchdog timer, as depicted at block 214, and processing system 20 computes a verification value "L," as shown at block 216. In one embodiment, the transmitter computes L=HMAC-SHA256(rN, LC128||KeyMX), where HMAC-SHA256 is computed over rN, the key used for HMAC is the concatenation of LC128 and KeyMX, LC128 is in big-endian order, and KeyMX is also appended in big-endian order.

Processing system 20 also begins polling a "Locality_Ready" bit in the downstream device, as shown at block 220. If the LOCALITY_READY status is not asserted within a maximum permitted round trip (RTT), the watchdog timer expires and the locality check fails. In other words, as shown at blocks 220 and 222, if the timer expires before the transmitting device detects LOCALITY_READY set on the receiving device, the transmitting device may consider the locality check to have been a failure. Accordingly, the process may pass through block 222 to block 240. Processing system 20 may implement a predetermined retry or failure count (e.g., 2 retries or 3 failures). If the maximum allowed retry or failure count has not been reached, processing system may increment the current count, as shown at blocks 240 and 242. As indicated by the arrow return to block 210, processing system 20 may then repeat the operations described above.

However, referring again to block 218, if processing system 20 detects LOCALITY_READY set before the timer expires, processing system 20 reads L' from the downstream device, as shown at block 222. Processing system 20 then compares L with L', and if those values match, processing system 20 determines that the locality check has succeeded, as indicated at block 230 and 232.

However, referring again to block 230, if L does not equal L', processing system 20 may consider the locality check to have failed. Furthermore, after reaching the maximum number of failures, processing system 20 may quit retrying and conclude that authentication has failed.

Figure 5:
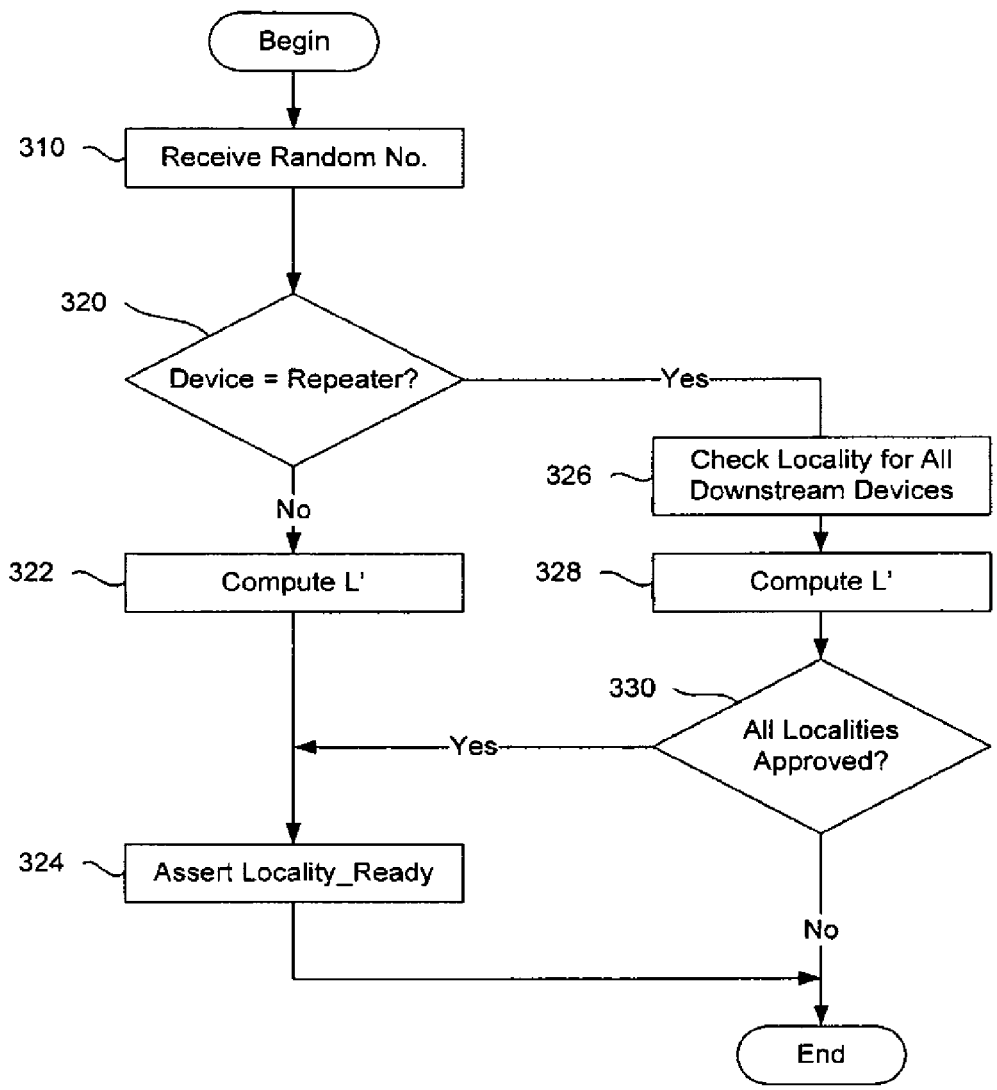
FIG. 5 is a flowchart depicting a process for supporting repeaters while checking locality according to an example embodiment of the present invention.

FIG. 5 is a flowchart of an example embodiment of a process for supporting repeaters while checking locality according to FIG. 4. The illustrated process begins after the source device has transmitted rN to the downstream device, as depicted at block 212 of FIG. 4. Block 310 of FIG. 5 depicts the downstream device receiving rN from processing system 20.

The way in which the downstream device cooperates with the transmitting device in response to receiving rN depends on whether or not the downstream device is a repeater. As indicated at blocks 320 and 322, if the receiving device is not a repeater, the downstream device (e.g., presentation device 50) computes a 256-bit value L'=HMAC-SHA256(rN, LC128||KeyMX). Then, after computing L', presentation device 50 sets its LOCALITY_READY bit, as shown at block 324.

However, if the downstream device is a repeater (e.g., repeater 120 in FIG. 1), whenever it receives a new locality-check request (e.g., when a new rN is received), repeater 120 immediately initiates a new locality check downstream. As shown at block 326, repeater 120 may check locality for all downstream devices. In one embodiment, repeater 120 uses a process like the one depicted in FIG. 4 to check downstream locality. For instance, repeater 120 may generate multiple different rNs, sending a different rNs to each downstream device. Repeater 120 may then poll the LOCALITY_READY bit of each downstream device, with regard to a watchdog timer. The locality check fails if the LOCALITY_READY status is not asserted within a maximum permitted time of RTT or if the L' from a downstream device does not match the corresponding L generated by repeater 120.

In addition, repeater 120 may generate L', as shown at block 328, but repeater 120 does not assert LOCALITY_READY until all locality checks have been successfully completed with all attached downstream devices, as shown at blocks 330 and 324.

Also, in one embodiment, a repeater initiates a locality check downstream only when the repeater receives a locality check request from upstream. In the case of a locality check failure (timeout or mismatch of L and L') downstream, repeater 120 will not set its LOCALITY_READY bit and will let the timeout occur upstream. In one embodiment, the locality check is then reattempted by the top-level transmitter two additional times (for a total of three consecutive times), with the transmission of a new rN. Three consecutive locality check failures, at the top-level transmitter, results in an authentication failure and the authentication protocol is aborted.

In one embodiment, locality checks are made for all devices, whether connected with wires or wirelessly. However, different values may be used for the watchdog timer (e.g., the maximum allowed RTT) in different implementations and/or for different types of interfaces. For instance, in one embodiment using wireless LAN connections, the watchdog timer allows up to a 7 ms RTT between the device pair at each level. Shorter RTTs may be imposed for wired connections.

In one embodiment, the source device operates as an HDCP transmitter, and it handles authentication failures as follows: On any authentication failure at the HDCP transmitter during the authentication protocol, the protocol must be aborted. If HDCP encryption is enabled, it is immediately disabled. Thus, if content has HDCP protection, the HDCP transmitter does not send that protected content to any downstream devices. However, authentication is typically reattempted at least once by the top-level HDCP transmitter by the transmission of a new rTx. An exception to this rule is in the case of authentication failure due to failure of SRM integrity check, or if the Receiver ID of an attached downstream HDCP device is in the revocation list. Authentication need not be re-attempted in these cases. Also, the HDCP repeater initiates re-authentication on its downstream HDCP-protected interface ports when it receives a re-authentication request from upstream.

Successful completion of AKE and locality check stages affirms to the top-level transmitter that the downstream devices are authorized to receive protected content. The transmitter may execute the authentication protocol for each downstream connection from the transmitter. Thus, if multiple devices are connected directly to the transmitting device, the transmitting device may repeat the AKE, pairing, and locality check process for each of those receiving devices. After successful locality checks (e.g., after successful verification of L'), the top-level HDCP transmitter then initiates session key exchange (SKE).

Figure 6:
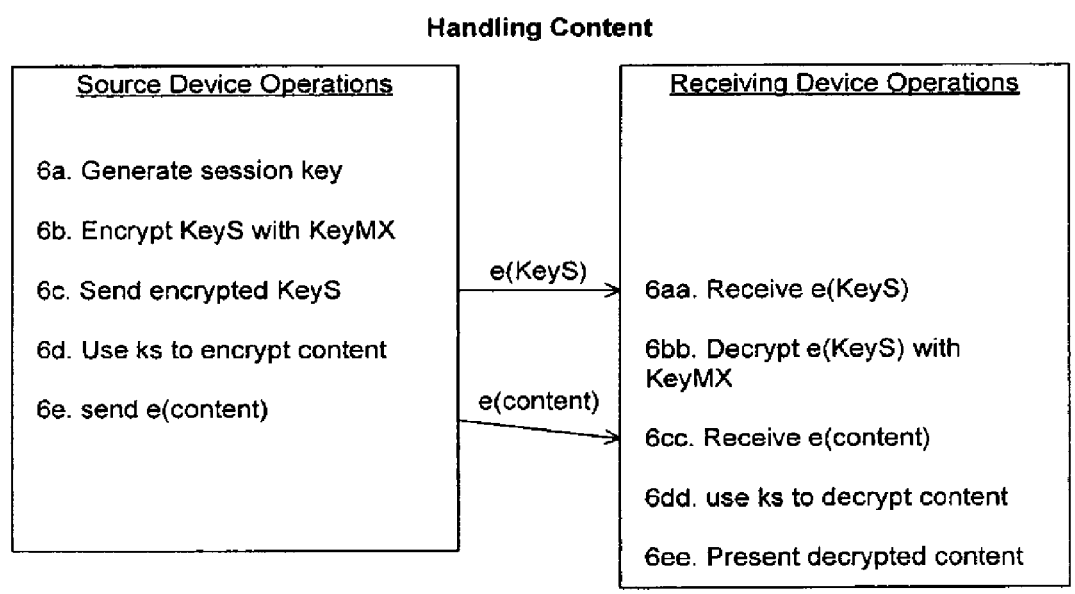
FIG. 6 is a diagram of a process for communicating protected content according to an example embodiment of the present invention.

FIG. 6 is a diagram of an example embodiment of a process for communicating protected content according to an example embodiment of the present invention. Part of that process is SKE. As shown at line 6a, SKE may begin with the top-level transmitter (e.g., processing system 20) generating the session key "KeyS." In one embodiment, processing system 20 generates KeyS as a random 128-bit value. As shown at line 6b, processing system 20 may then encrypt KeyS with KeyMX, using the AES cipher block in counter mode. This encrypted session key may be referred to as e(KeyS). In one embodiment, rTx||sessionCtr is the 128-bit input to the AES-CTR module (along with KeyMX), where sessionCtr is a 64-bit counter that is initialized to zero on every new authentication request (e.g., upon transmission of a new rTx value by the transmitter). SessionCtr should not be reset at any other time, and if there are multiple session key exchanges following authentication, sessionCtr should be incremented by one following every session key exchange. Processing system 20 may XOR the output from the cipher module with KeyS to generate e(KeyS).

As shown at line 6c, processing system 20 may then send e(KeyS) to the downstream device (e.g., presentation device 50). Specifically, in one embodiment, processing system 20 sends a value that includes e(KeyS), as well as a hash of e(KeyS). This combined value may be referred to as EncHashS. In one embodiment, processing system computes a 256-bit hash of e(KeyS) as SHA-256(e(KeyS)), and then appends the hash to e(KeyS). In other words, EncHashS=e(KeyS)||SHA-256(e(KeyS)). Processing system 20 may also resend EncHashS to presentation device 50 in response to receiving MSG from presentation device 50.

As shown at lines 6aa and 6bb, in response to receiving EncHashS, presentation device 50 computes SHA-256(e(KeyS)) and compares that value against the hash value in EncHashS. If there is a mismatch, presentation device 50 sends MSG to processing system 20. If the hash values match, presentation device 50 decrypts e(KeyS) with KeyMX, using the AES cipher module in counter mode.

In one embodiment, processing system 20 enables content encryption 10 ms after sending after sending EncHashS. Content encrypted with KeyS then starts to flow between processing system 20 and presentation device 50, as shown at lines 6d and 6e. Such encryption should be enabled only after successful completion of AKE, locality check, and SKE stages. Once encrypted content has started flowing, presentation device 50 uses KeyS to decrypt the content, as shown at line 6dd, and presentation device 50 presents or displays to content to be perceived or perceived by the user, as shown at line 6ee.

In one embodiment, when a content distribution environment (e.g., LAN 64) includes one or more repeaters (e.g., repeater 120 in data processing environment 12), the repeater(s) sends an encrypted session key to attached downstream devices only when the repeater receives an encrypted session key from the upstream transmitter, and the repeater enables encryption downstream after SKE and on seeing encryption enabled upstream.

Authentication with Repeaters

One embodiment handles authentication with repeaters as follows: The transmitter executes authentication with repeaters after SKE and only when RPT is set, indicating that the attached receiver is a repeater. Authentication with repeaters is implemented in parallel with the flow of encrypted content and link synchronization. The link synchronization process is explained in greater detail below. During the process of authentication with repeaters, each transmitter and repeater assembles a list identifying all downstream receivers attached to the device. This list may be structured as a tree containing Receiver IDs that identify the permitted connections. This tree enables upstream revocation support.

In particular, repeaters assemble the list of all attached downstream receivers as the downstream interface ports of the repeater are successfully authenticated (e.g., successful completion of the AKE and locality check stages with attached receivers). The list is represented by a contiguous set of bytes, with each Receiver ID occupying eight bytes stored in big-endian order. The total length of the Receiver ID list is eight bytes times the total number of attached and active downstream devices, including downstream repeaters. A protected interface port with no active device attached adds nothing to the list. Also, the Receiver ID of the repeater itself at any level is not included in its own Receiver ID list. If a device has a protected interface port connected to a receiver that is not a repeater, the device adds the Receiver ID of that receiver to the list for that device. If a device has a protected interface port attached to a repeater, the device adds the Receiver ID list read from the attached repeater, plus the Receiver ID of the attached repeater itself.

Also, before a device accepts the Receiver ID list of an attached repeater, the device may verify the integrity of the list by computing V and checking this value against V' received from the attached repeater. If V does not equal V, the downstream Receiver ID list integrity check fails, and the device must not assert its READY status. An upstream transmitter will detect this failure by the expiration of a watchdog timer set in the transmitter. On expiration of the watchdog timer, authentication fails, the authentication protocol is aborted, and encryption is disabled.

In particular, when a repeater has assembled the complete list of Receiver IDs for the attached Devices, the repeater computes the verification value V'=HMAC-SHA256(Receiver ID list||Binfo, (LC128||KeyMX) XOR rN). In other words, HMAC-SHA256 is computed over the concatenation of Receiver ID list and Binfo. In one embodiment, Binfo contains depth and device-count values. For instance, Binfo may have the following format:

| Name | Bit Field | Rd/Wr | Description |
|---|---|---|---|
| Rsvd | 15:12 | Rd | Reserved. Read as zero. |
| Max_Cascade_Exceeded. | 11 | Rd | Topology error indicator. When set to one, more than four levels of repeater have been cascaded together. |
| Depth | 10:8 | Rd | Three-bit repeater cascade depth. This value gives the number of attached levels through the connection topology. |
| Max_Devs_Exceeded | 7 | Rd | Topology error indicator. When set to one, more than 31 downstream devices are attached. |
| Device_Count | 6:0 | Rd | Total number of attached downstream devices. Always zero for HDCP Receivers. This count does not include the HDCP Repeater itself, but only devices downstream from the HDCP Repeater. |

The key used for HMAC is the concatenation of LC128 and KeyMX XOR-ed with rN. All values are in big-endian order. When both the Receiver ID list and V' are available, the repeater asserts its READY status indicator.

The transmitter, having determined that RPT is set, sets a two-second watchdog timer and polls the repeater's READY status bit. When READY is set, the transmitter reads the Receiver ID list and V' from the repeater. The transmitter verifies the integrity of the Receiver ID list by computing V and comparing this value to V. If V is not equal to V', the transmitter re-reads the Receiver ID list, Binfo, and V two additional times (for a total of three consecutive V' checks) to account for the possibility of link errors. The authentication protocol is aborted on three consecutive mismatches between V and V', authentication fails, authentication protocol is aborted, and encryption is disabled.

If the asserted READY status is not received by the transmitter within a maximum-permitted time of two seconds after sending e(KeyS), authentication of the repeater fails. With this failure, the transmitter disables encryption and aborts the authentication protocol with the repeater.

In addition to assembling the Receiver ID list, a repeater propagates topology information upward through the connection tree to the transmitter. Specifically, a repeater reports the topology status variables DEVICE_COUNT and DEPTH. The DEVICE_COUNT for a repeater is equal to the total number of attached downstream receivers and repeaters. The value is calculated as the sum of the number of attached downstream receivers and repeaters, plus the sum of the DEVICE_COUNT read from all attached repeaters. The DEPTH for a repeater is equal to the maximum number of connection levels below any of the downstream interface ports. The value is calculated as the maximum DEPTH reported from downstream repeaters plus one (accounting for the repeater itself).

Repeaters are capable of supporting DEVICE_COUNT values less than or equal to 31 and DEPTH values less than or equal to 4. If the computed DEVICE_COUNT for a repeater exceeds 31, the repeater asserts the MAX_DEVS_EX- CEEDED status bit. If the computed DEPTH for a repeater exceeds four, the repeater asserts the MAX_CASCADE_EXCEEDED status bit. When a repeater receives a MAX_DEVS_EXCEEDED or a MAX_CASCADE_EXCEEDED status from a downstream repeater, it must assert the corresponding status bits to the upstream transmitter and assert the READY bit. Authentication fails if the topology maximums are exceeded. Encryption is disabled, and the authentication protocol is aborted.

The top-level transmitter, having already performed SRM integrity check during AKE, proceeds to see if the Receiver ID of any downstream device is found in the current revocation list, and, if any such Receiver ID is present, authentication fails, encryption is disabled, and authentication protocol is aborted.

As indicated above, after successful completion of SKE, encryption is enabled, and encrypted content starts to flow between the transmitter and the receiver. Once encrypted content starts to flow, link synchronization is performed periodically, to maintain cipher synchronization between the transmitter and the receiver. To perform link synchronization, the transmitter periodically sends its input counter value "inputCtr" to the receiver when encryption is enabled. The receiver updates its inputCtr with the counter value received from the transmitter. For example in an IP stream, link synchronization is achieved every time a packetized elementary stream (PES) header is transmitted, by the inclusion of inputCtr in the header.

In the embodiment of FIG. 1, the transmitter uses one encryption technique for content to be transmitted over low-bandwidth connections, and a different encryption technique for content to be transmitted over high-bandwidth connections. In addition, the transmitter automatically selects the appropriate encryption technique, based on the type of connection or interface port to be used. The resources for encrypting the content to be transmitted over high-bandwidth connections may be referred to as a first encryption subsystem. The resources for encrypting the content to be transmitted over low-bandwidth connections may be referred to as a second encryption subsystem. For instance, the transmitter may use the first encryption subsystem for content to be transmitted over a wired connection, and the second encryption subsystem for content to be transmitted over a wireless connection.

Figure 7:
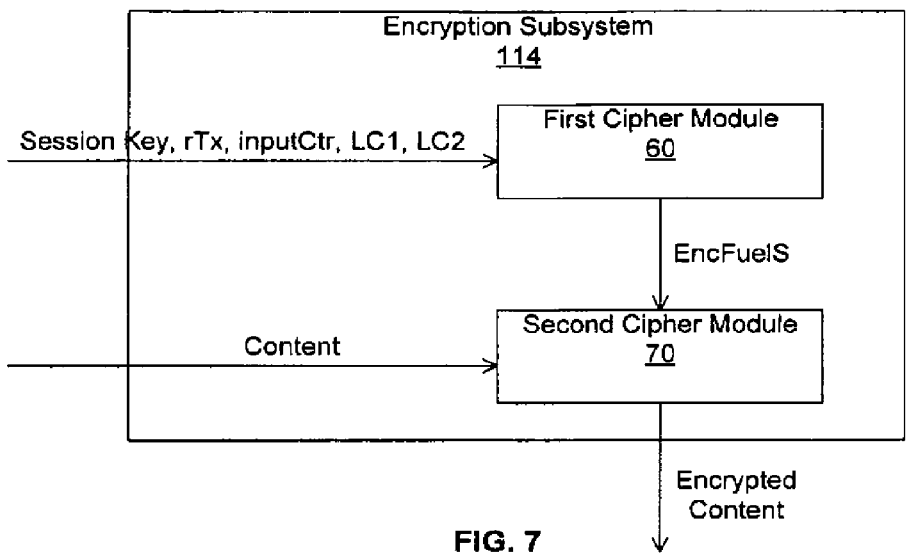
FIG. 7 is a block diagram of an example embodiment of an encryption subsystem, in the context of the data processing environment of FIG. 1.

FIG. 7 is a block diagram of an example embodiment of an encryption subsystem, in the context of the data processing environment of FIG. 1. In particular, FIG. 7 depicts a first encryption subsystem 114 for encrypting content to be transmitted over high-bandwidth connections. As illustrated, encryption subsystem 114 includes a first cipher module 60 and a second cipher module 70. First cipher module 60 generates output data that is used to refresh the cipher state of second cipher module 70. Consequently, the cipher output from first cipher module 60 may be referred to as "encryption fuel for refreshing cipher state" or "EncFuelS." First cipher module 60 generates EncFuelS based at least in part KeyS, rTx, inputCtr, LC1, and LC2, where LC1 and LC2 are first and second licensed constants. For instance, LC1 may be LC128, and LC2 may be LC64. Second cipher module 70 uses the EncFuelS to generate encrypted content from plaintext content.

FIGS. 8-11 are block diagrams depicting example embodiments of various cipher modules within encryption subsystem 114. In one embodiment, the cipher modules are used to encrypt digital video content that includes lines of data, within frames. Furthermore, first cipher module 60 refreshes the cipher state of second cipher module 70 at the beginning of every frame and the beginning of every line.

Figure 8:
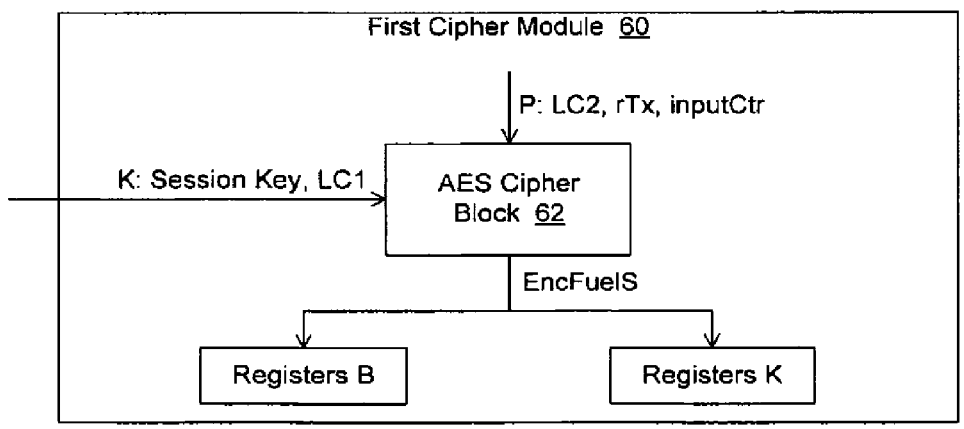
FIGS. 8-11 are block diagrams depicting example embodiments of various cipher modules or subsystems within the encryption subsystem of FIG. 7.

In particular, FIG. 8 depicts how processing system 20 uses first cipher module 60 to refresh the cipher state of second cipher module 70 at the beginning of a frame. This process may be referred to as frame key calculation. In the embodiment of FIG. 8, processing system 20 uses an AES cipher block 62 within first cipher module 60 to generate EncFuelS. In particular, AES cipher block 62 operates in counter mode, and receives a plaintext "P" and a key "K." K occupies 128 bits, and is computed as K=KeyS XOR LC1. P occupies 128 bits, computed as P=((RPT∥rTx[62:0]) XOR LC2) inputCtr), where inputCtr is a 64-bit counter that is initialized to 0 after every SKE and incremented after every frame key calculation, and where RPT is the value of the repeater bit read from the downstream device. By including RPT in the cipher data, the transmitter may prevent a hacker from gaining access to protected data by sending RPT=0 to the transmitter. Alternatively, the transmitter could include RPT in the H' MAC computations during AKE.

Based on P and K, AES cipher block 62 generates EncFuelS, and first cipher module 60 stores EncFuelS (or portions thereof) in register B and register K. Register B and register K store the cipher state for second cipher module 70. By updating register B and register K, AES cipher block 62 refreshes the cipher state of second cipher module 70. In particular, in one embodiment, second cipher module 70 includes four registers B and four registers K. AES cipher block 62 is operated twice, with the 84 least significant bits of EncFuelS from one operation stored in each register B, and the 84 least significant bits of EncFuelS from the other operation stored in each register K. The data that first cipher module 60 stores in registers B and K in this manner may be referred to as frame keys.

Figure 9:
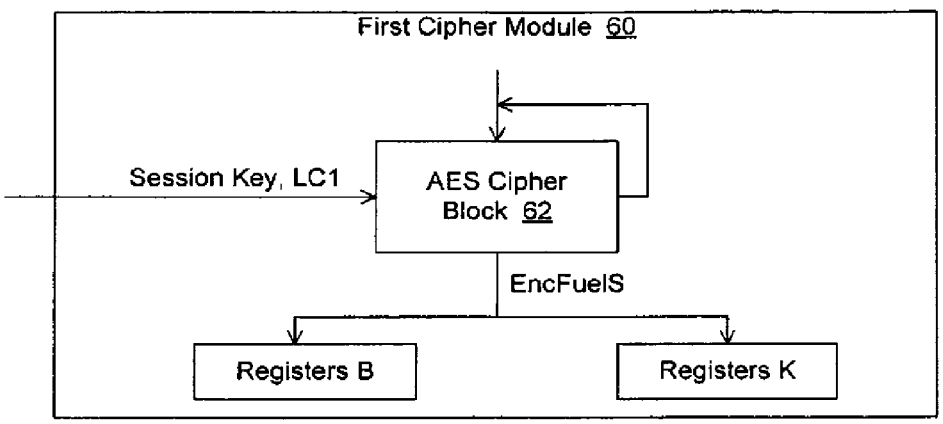

The block diagram of FIG. 9 depicts how processing system 20 uses first cipher module 60 to refresh the cipher state of second cipher module 70 at the beginning of a line. This process may be referred to as line key calculation. For line key calculation, processing system 20 uses AES cipher block 62 in output-feedback (OFB) mode. K serves as input, where K occupies 128 bits, and is computed as K=KeyS XOR LC1. AES cipher block 62 is operated twice, with the 84 least significant bits of EncFuelS from one operation stored in each register B, and the 84 least significant bits of EncFuelS from the other operation stored in each register K. The data that first cipher module 60 stores in registers B and K in this manner may be referred to as line keys.

Thus, AES-CTR mode is used for frame key calculation and AES-OFB mode is used for line key calculation. First cipher module 60 refreshes the cipher state of second cipher module 70 (i.e., loads new keys) at the beginning of every frame and every line.

Figure 10:
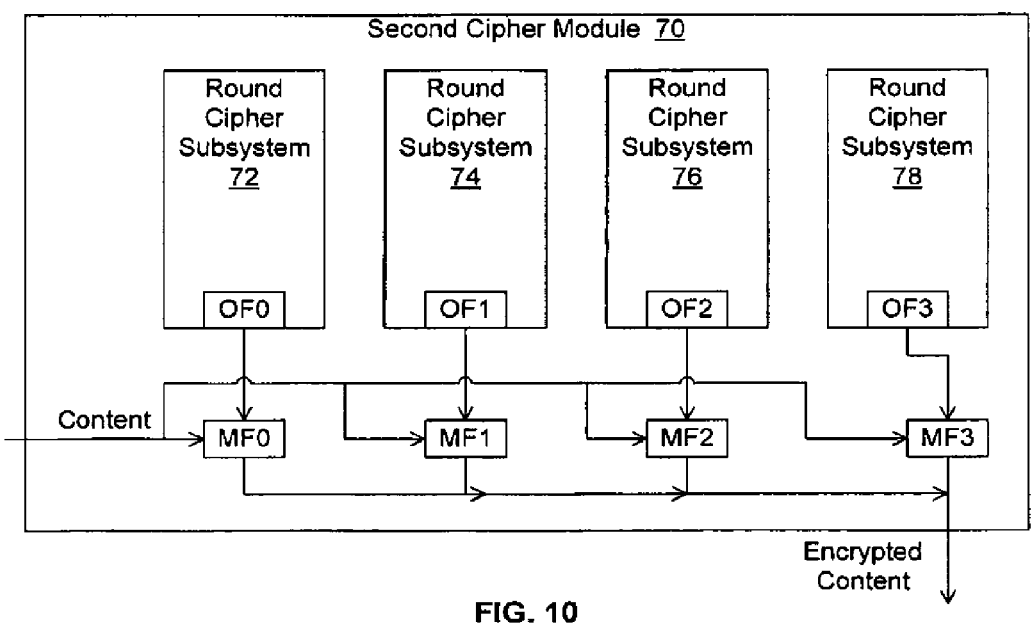

FIG. 10 is a block diagram depicting an example embodiment of second cipher module 70. In the embodiment of FIG. 10, second cipher module 70 includes four round cipher subsystems 72, 74, 76, and 78. Each round cipher subsystem includes a register B and a register K. Each round cipher subsystem also includes an output function (OF). Those output functions may be referred to as OF0, OF1, OF2, and OF3.

Figure 11:
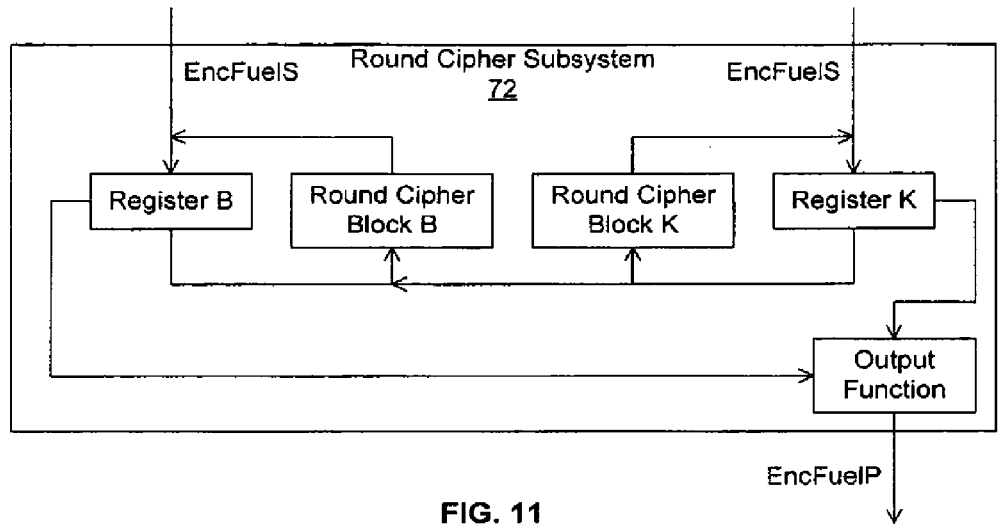

FIG. 11 depicts round cipher subsystem 72 in greater detail. As illustrated, first cipher module 60 loads data from EncFuelS into register B and register K within round cipher subsystem 72 for frame key calculation and line key calculation. Consequently, a round cipher block B and a round cipher block K cooperate to modify or mix the data in registers B and K. Also, at certain times, the data from registers B and K (i.e., the "BK data") feeds into an output function, and in response, the output function generates 32 bits of output data for encrypting pixel data. Accordingly, this output data from round cipher subsystem 72 may be referred to as EncFuelP.

As shown in FIG. 10, second cipher module 70 includes four mixing functions (MF0, MF1, MF2, and MF3), corresponding to the four output functions. The four mixing functions accept four consecutive pixels of content, one pixel per mixing function, and modify the pixel data, based on the EncFuelP. In one embodiment, the mixing functions use an XOR operation (e.g., encrypted pixel=plaintext pixel XOR EncFuelP).

In one embodiment, round cipher subsystem 72 operates like an HDCP cipher module, according to the HDCP Specification version 1.3. Accordingly, round cipher subsystem 72 may be referred to as an HDCP cipher module. The other round cipher subsystems may operate in the same way as round cipher subsystem 72, or in a similar manner.

In the embodiment of FIG. 10, the four round cipher subsystems run concurrently. Specifically, all four round cipher subsystems are clocked for every HDCP clock, and their state is updated. However, in the embodiment of FIG. 10, each round cipher subsystem is used for encrypting only every fourth pixel. Consequently, each round cipher subsystem mixes the BK data for four clock ticks, for each pixel of output. In other embodiments, more than four round cipher subsystems may be used, and the BK data may be mixed for more than four clock ticks, for each pixel of output.

Thus, as has been described, for content to be protected over a high-bandwidth connection, four HDCP cipher modules may be used for encrypting pixel data, and an AES module may be used to refresh the state of all four HDCP cipher modules for every frame and every line. For purposes of this disclosure, the cipher data (e.g., EncFuelS) that first cipher module 60 uses to refresh the cipher state of second cipher module 70 (as shown in FIGS. 7-9) may be referred to as primary cipher data or AES cipher data. Similarly, the cipher data (e.g., EncFuelP) that second cipher module 70 uses in the mixing functions to encrypt the content (as shown in FIGS. 10 and 11) may be referred to as secondary cipher data or round cipher data.

Figure 12:
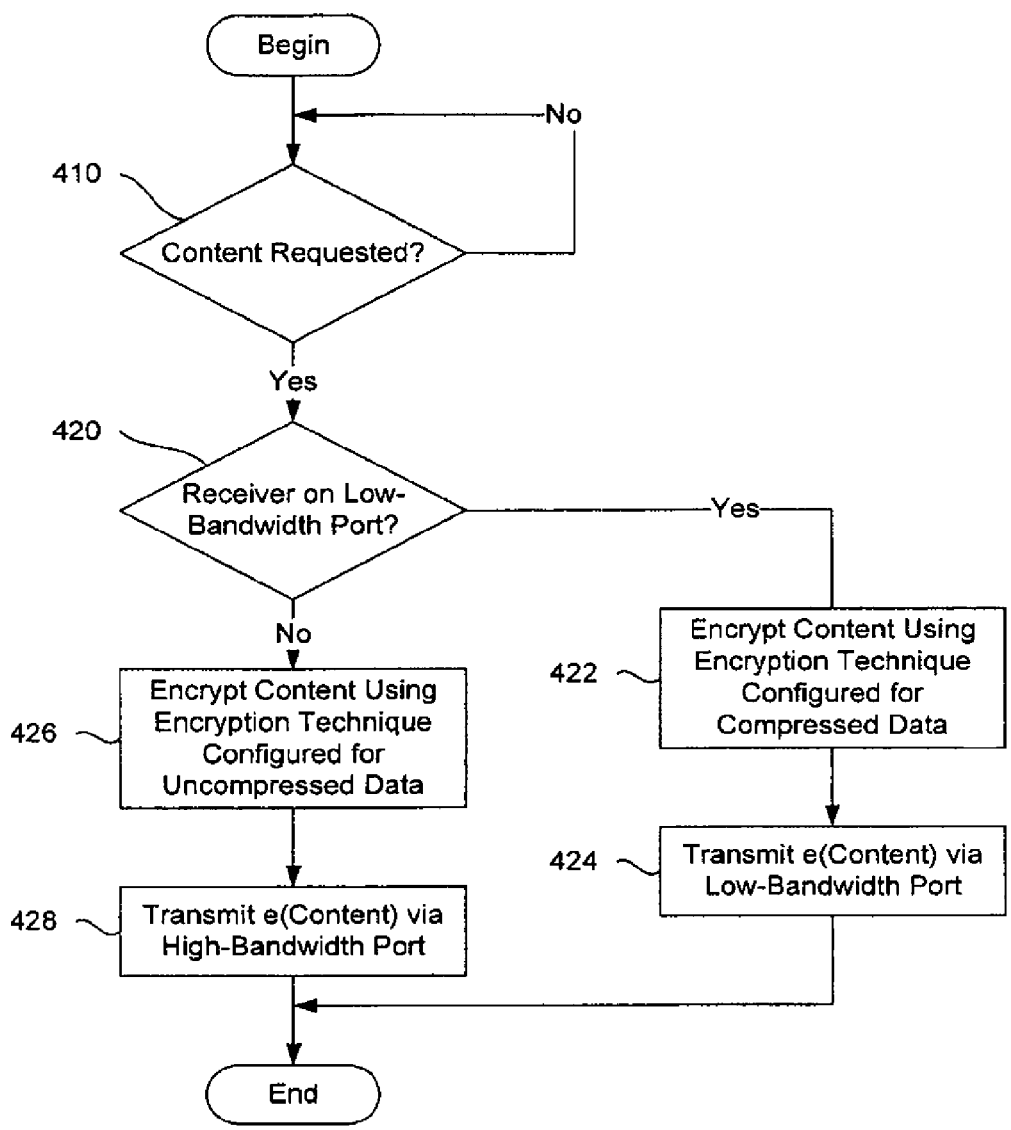
FIG. 12 is a flowchart depicting an example embodiment of a process for automatically selecting among encryption processes to protect digital content in the context of the data processing environment of FIG. 1.

As indicated above, processing system 20 may use different encryption techniques for content, depending on the type of connection to be used for transmitting the content. FIG. 12 is a flowchart depicting an example embodiment of a process for automatically selecting among encryption processes or resources, based at least in part on the type of connection or interface port to be used for communicating that content. The process of FIG. 12 may begin after processing system 20 has performed AKE and SKE according to the techniques described above. Then, as shown at block 410, processing system 20 may wait for a request or instruction for protected content to be transmitted to a presentation device. In response to such a request, processing system 20 may automatically determine whether that presentation device is connected to processing system 20 via a low-bandwidth connection or a high-bandwidth connection, as depicted at block 420. For instance, processing system 20 may determine whether the presentation device is connected to processing system 20 via a wireless interface port.

As shown at block 426, if the content is to be transmitted via a high-bandwidth connection, processing system 20 may encrypt the content using an encryption technique suitable for uncompressed data. For instance, processing system 20 may use encryption subsystem 114 to encrypt content to be transmitted over a wired connection. As depicted at block 428, processing system 20 may then transmit the encrypted content via the high-bandwidth port. The receiving device may then use similar techniques to decrypt the encrypted content.

However, as shown at block 422, if the content is to be transmitted via a low-bandwidth connection, processing system 20 may encrypt the content using an encryption technique suitable for compressed data.

Figure 13:
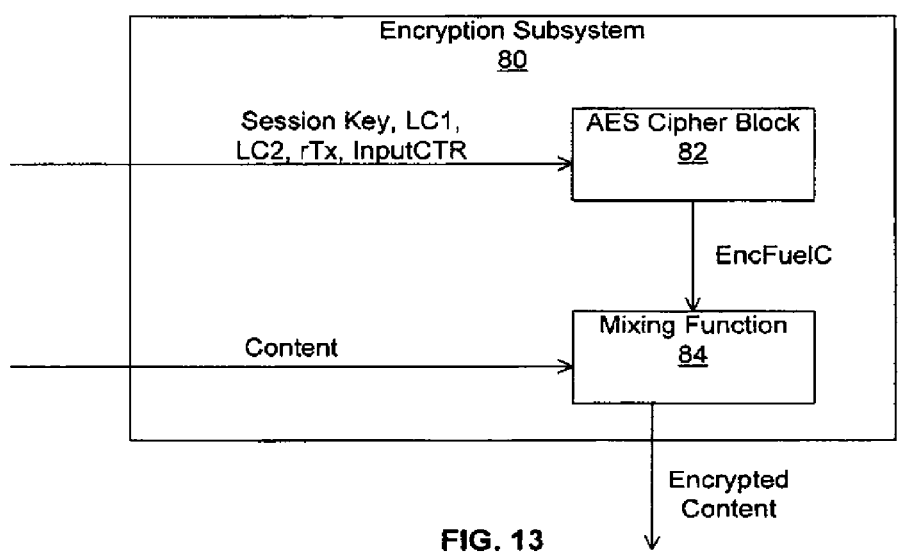
FIG. 13 is a block diagram of another example embodiment of an encryption subsystem in the context of the data processing environment of FIG. 1.

FIG. 13 is a block diagram of an example embodiment of an encryption subsystem suitable for encrypting compressed data. This encryption subsystem is referred to as encryption subsystem 80. As illustrated, encryption subsystem 80 includes an AES cipher block 82 and a mixing function 84. AES cipher block 82 generates data for encrypting the compressed content, based on input values such as a session key, first and second licensed constants, a random number, and a counter. The data for encrypting the compressed content may be referred to as "encryption fuel for compressed data" or "EncFuelC."

In one embodiment, AES cipher block 82 is a 128-bit AES module that is operated in a counter mode. First cipher module 60 and encryption subsystem 80 may use the same AES cipher block, for instance. In the embodiment of FIG. 13, encryption subsystem 80 performs the AES cipher for every 128-bit block of input. Also, encryption subsystem 80 uses as input a plaintext "P" and a key "K." P is a 128-bit value, computed as P=((RPT∥rTx[62:0])XOR LC2) II cipherCtr, where RPT is the repeat bit value obtained from the receiving device, and cipherCtr is a 64-bit counter that is initialized to 0 after every SKE, but is not reset at any other time. Also, cipherCtr is incremented by one following every cipher operation. K is a 128-bit value, computed as K=KeyS XOR LC1. Encryption subsystem 80 uses mixing function 84 to XOR the output from AES cipher block 82 with the 128-bit input content to produce the 128-bit encrypted output.

Referring again to FIG. 12, after selecting and using a suitable encryption subsystem for compressed content, processing system 20 may then transmit the encrypted content via the low bandwidth port, as shown at block 424. The receiving device may then use similar techniques to decrypt the encrypted content.

In the embodiment of FIG. 1, processing system 20 enables encryption only when data processing environment 12 is in an authenticated state. At all other times, processing system 20 disables encryption. In particular, processing system 20 enables or disables encryption at frame boundaries. Processing system 20 may use an ENC_EN signal to indicate that encryption is enabled and an ENC_DIS signal to indicate that encryption is disabled.

As has been described, devices in a data processing environment may use 1024-bit RSA authentication, together with 128 bit AES encryption, to provide protection for content transmitted between the devices. The devices may also automatically distinguish between high-bandwidth connections and low-bandwidth connections, and may select a suitable encryption technique depending on the connection type. In addition, for certain types of content, the sending and receiving devices may combine AES encryption techniques with the kinds of encryption techniques described in the HDCP Specification version 1.3. For instance, an AES cipher block may be used to periodically refresh the cipher state of an encryption subsystem that uses four HDCP cipher blocks.

Furthermore, transmitters and such environments are not required to store any unique, secret keys in nonvolatile storage. Instead, a transmitter may store a 3072-bit public key for a CA. A receiver may store its 1024-bit public and private keys, with the private key saved in secure storage. Alternatively, the private key may be stored in the form of a 128 bit seed, from which the 1024-bit key is derived (e.g., using Maurer's algorithm for generating primes). Transmitters, receivers, and repeaters may also store licensed constants, and it may be necessary to keep licensed constants secret, but the licensed constants are not unique, in at least one embodiment.

For purposes of this disclosure, references to random numbers or values should be construed to also include pseudorandom numbers or values. Also, references to operations for concatenating of appending values together generally involve the values being appended in big-endian order.

In light of the principles and example embodiments described and illustrated herein, it will be recognized that the illustrated embodiments can be modified in arrangement and detail without departing from such principles. For instance, an environment may include presentation devices that support AKE, SKE, etc., as well unprotected devices (i.e., devices that do not support AKE, SKE, etc). In such an environment, although the top level transmitter should not provide protected content to unprotected devices, the transmitter may send public domain or other unprotected content to unprotected devices. In one embodiment, the top level transmitter ensures that unprotected presentation devices do not receive protected content, but otherwise disregards the unprotected devices for operations such as AKE, SKE, etc.

Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. The control logic for providing the functionality described and illustrated herein may be implemented as hardware, software, or combinations of hardware and software in different embodiments. For instance, one or more modules, subsystems, etc., in one or more devices may be implemented as embedded controllers, using components such as programmable or non-programmable logic devices or arrays, application-specific integrated circuits (ASICs), embedded processors, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other platforms or devices for processing or transmitting information.

In view of the wide variety of useful permutations that may be readily derived from the example embodiments described herein, this detailed description is intended to be illustrative only, and should not be taken as limiting the scope of the invention. What is claimed as the invention, therefore, is each implementation that comes within the scope and spirit of the following claims, and all equivalents to such implementations.

What is claimed is:

1. A system, to provide protected digital content, comprising:
    at least one processor and control logic which, when used by the at least one processor, results in the system performing operations comprising:
    determining a first receiver, coupled to the system, satisfies a predetermined maximum round trip time (RTT) for a pair of messages communicated between the system and the first receiver; and
    determining a second receiver, coupled to the system, satisfies the RTT for a second pair of messages communicated between the first receiver and the second receiver;
    determining a first value based on data from the system and data from the first receiver, and obtaining, from the first receiver, a second value based on the data from the system and the data from the first receiver;
    wherein the system is physically upstream to the first receiver, the first receiver is physically upstream to the second receiver, and determining the first receiver satisfies the RTT is based on (a) transmitting a first message to the first receiver, and (b) obtaining a first response to the first message, within a first time period, indicating the first receiver is ready for proximity testing.

2. The system of claim 1, wherein the operations comprise:
    determining the first receiver satisfies the RTT based on the first and second values.

3. The system of claim 1, wherein the operations comprise:
    receiving a second message from a source device that is coupled to and upstream of the system; and
    providing a second response to the second message within a second time period.

4. The system of claim 3, wherein the second time period is a first duration when the system couples to the first receiver via a wireless coupling and the second time period is a second duration when the system couples to the first receiver via non-wireless coupling, the second duration being shorter than the first duration.

5. The system of claim 1, wherein the operations comprise:
    assessing a second message from a source device that is coupled to and upstream of the system; and
    determining the first and second receivers satisfy the RTT based on assessing the second message.

6. The processing system of claim 5, wherein the operations comprise providing an indicator value to the source device, the indicator value indicating the system is ready for proximity testing, based on determining the first and second receivers satisfy the RTT.

7. The processing system of claim 1, wherein the operations comprise determining locality between the system and the first receiver based on comparing the first and second values with each other.

8. A protected digital content provisioning system comprising:
first and second receivers; and
a processing system, to couple to the first and second receivers, that includes at least one processor and control logic which, when used by the at least one processor, results in the processing system performing operations comprising:
determining that the first receiver satisfies a predetermined maximum round trip time (RTT) for a pair of messages communicated between the processing system and the first receiver; and
determining that the second receiver satisfies the RTT for a second pair of messages communicated between the first receiver and the second receiver;
providing a first message to the first receiver;
obtaining a first response to the first message, within a first time period, indicating the first receiver is ready for proximity testing;
determining the first receiver satisfies the RTT based on obtaining the first response within the first time period;
determining a first value based on data from the system and data from the first receiver; and
obtaining, from the first receiver, a second value based on the data from the system and the data from the first receiver;
wherein the processing system is physically upstream to the first receiver and the first receiver is physically upstream to the second receiver, the second receiver communicatively coupled to the processing system via the first receiver.

9. The system of claim 8, wherein the operations comprise:
determining the first receiver satisfies the RTT based on the first and second values.

10. The system of claim 8 comprising:
a source device coupled to the processing system and upstream to the processing system, wherein the operations comprise:
receiving a second message from the source device; and
providing, to the source device, a second response to the second message within a second time period based on determining the first and second receivers satisfy the RTT.

11. The system of claim 10, wherein the second time period is a first duration when the processing system couples to the first receiver via a wireless coupling and the second time period is a second duration when the processing system couples to the first receiver via non-wireless coupling, the second duration being shorter than the first duration.

12. The system of claim 8 further comprising:
a source device coupled to the processing system and upstream to the processing system, wherein the operations comprise:
assessing a second message from the source device; and
determining the first and second receivers satisfy the RTT based on assessing the second message.

13. The system of claim 12, wherein the operations comprise determining locality between the system and the first receiver based on comparing the first and second values with each other.

14. The processing system of claim 12, wherein the operations comprise providing an indicator value to the source device, the indicator value indicating the processing system is ready for proximity testing, based on determining the first and second receivers satisfy the RTT.

15. At least one non-transitory storage medium having instructions stored thereon for causing a processor based system, having at least one processor, to:
provide a first message to a first receiver and obtain a first response to the first message, within a first time period, indicating the first receiver is ready for proximity testing;
determine the first receiver satisfies a predetermined maximum round trip time (RTT) based on obtaining the first response within the first time period;
determine a second receiver, coupled to the system, satisfies the RTT for a pair of messages communicated between the first receiver and the second receiver;
determine a first value based on data from the system and data from the first receiver; and
obtain, from the first receiver, a second value based on the data from the system and the data from the first receiver;
wherein the system is physically upstream to the first receiver and the first receiver is physically upstream to the second receiver.

16. The at least one medium of claim 15 including instructions to:
receive a second message from a source device; and
provide, to the source device, a second response to the second message within a second time period based on determining the first and second receivers satisfy the RTT;
wherein the processing system is coupled to and downstream of the source device.

17. The at least one medium of claim 15 including instructions to:
assess a second message from a source device; and
determine the first and second receivers satisfy the RTT based on assessing the second message;
wherein the system is coupled to and downstream of the source device.

18. The at least one medium of claim 15 including instructions to determine locality between the system and the first receiver based on comparing the first and second values with each other.

* * * * *